FINAL POLISH APPLIED (BY PASSING THROUGH ROTOCURE AGAINST A POLISHED POLYESTER FILM).

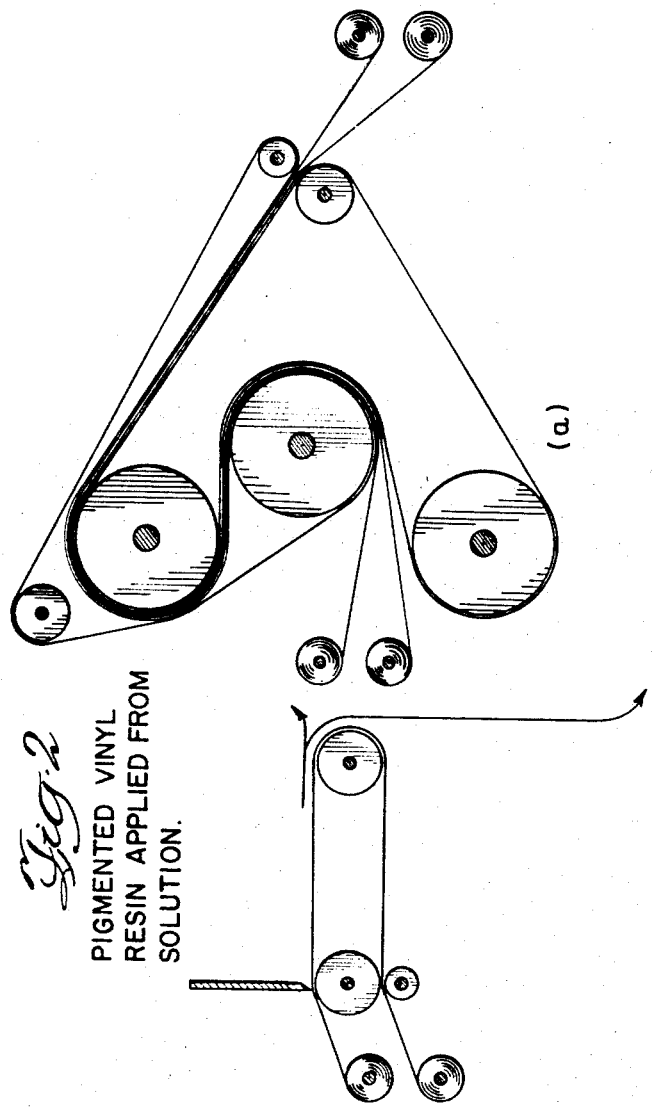
Fig. 1 — CALENDER RESIN ONTO BASE FABRIC.
Fig. 2 — PIGMENTED VINYL RESIN APPLIED FROM SOLUTION.
Fig. 3 — EMBOSSING BY EITHER (a) PASSING THROUGH ROTOCURE AGAINST AN EMBOSSED PAPER OR (b) THROUGH AN EMBOSSING MACHINE WITH AN ENGRAVED ROLLER.
INVENTOR
Edward W. McCarthy
By John L. Hutchinson
ATTORNEY Feb. 25, 1969 E. W. McCARTHY 3,429,729
CHLOROSULFONATED POLYETHYLENE FABRIC HAVING
VINYL AND POLYURETHANE COATINGS
Filed July 26, 1965 Sheet 2 of 2

APPLICATION OF A CLEAR POLYURETHANE RESIN FROM SOLUTION.

INVENTOR
Edward W. McCarthy
BY John L. Hutchinson
ATTORNEY 3,429,729
CHLOROSULFONATED POLYETHYLENE
FABRIC HAVING VINYL AND POLY-
URETHANE COATINGS
Edward W. McCarthy, Poughkeepsie, N.Y., assignor
to Chemical Rubber Products, Inc., Beacon, N.Y., a
corporation of New York
Filed July 26, 1965, Ser. No. 474,877
U.S. Cl. 117—11  9 Claims
Int. Cl. B32b 27/40, 27/04, 27/30

ABSTRACT OF THE DISCLOSURE

Composite fabric for use as shoe materials comprising a chlorosulfonated polyethylene impregnated base fabric coated with a vinyl resin such as a vinyl halide and a transparent polyurethane resin.

---

Figure 5:
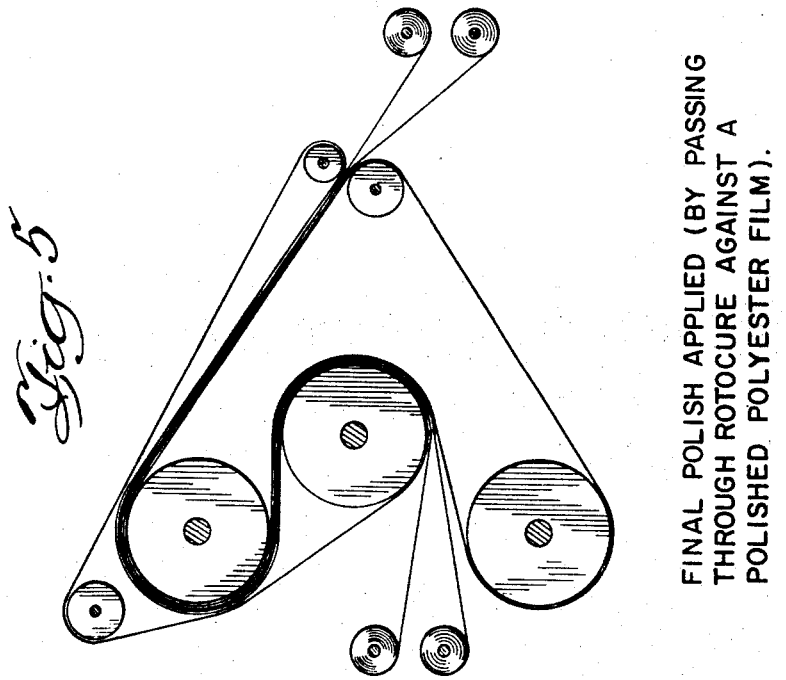

The present invention is concerned with a new composite fabric and, more particularly, with a fabric containing a chlorosulfonated polyethylene.

Various synthetic fabrics of one type or another have been developed to achieve properties or advantages not available in natural fabrics such as cotton cloth, duck, and similar materials or even with animal derived products such as hides.

The present invention has as one of its principal objects the provision of a new synthetic fabric capable of use in the manufacture of articles such as shoes, pocketbooks, luggage and upholstery.

Another object to to provide a synthetic fabric which has improved elasticity, toughness, resistance to scuffing, wear and abrasion as well as being substantially waterproof and crack resistant.

A further object is to provide a synthetic fabric of the foregoing type which may be manufactured at reasonable cost in large volume.

In brief, the synthetic fabric contemplated by this invention comprises a base consisting of a fabric impregnated or coated with a chlorosulfonated polyethylene, preferably combined with a vinyl resin, a second layer or laminae comprising a vinyl resin containing a pigment and a top laminae of a clear or transparent polyurethane resin.

The fabric of the base may be formed of any type of natural or synthetic fiber such as cotton, rayon, nylon or the like. Preferably, the base fabric is of the woven variety to obtain maximum strength in the finished product and easier handling in the manufacturing operations.

As indicated, the base fabric is coated or impregnated with a chlorosulfonated polyethylene resin. Preferably, the polyethylene resin will contain between about 20 to 30 percent chlorine and from about .90 to 1.30 percent sulfur. Commercially available resins of the type contemplated are sold under the name Hypalon, a trademark of E. I. Du Pont de Nemours and Co. The modification of the polyethylene with chlorine and sulfur in the ranges indicated chemically alters the normally thermoplastic polyethylene resin and converts it into an elastomeric type product having the characteristics of a rubber. Chlorosulfonated elastomers of the type contemplated are, in general, more thermoplastic than most rubbers and contain substantially no unsaturation, whereby they have a greater resistance to ageing and breakdown due to oxidation. Exemplary chlorosulfonated products are disclosed in U.S. Patent 2,586,363.

For most applications contemplated the chlorosulfonated polyethylene resin is usually compounded with fillers and processing aids and, preferably, blended with from 30 to about 70 percent of a vinyl resin, particularly a polyvinyl halide, such as polyvinyl chloride. Copolymers of vinyl halide and an ethylenically unsaturated compound are also contemplated, for example the alkenyl esters of monocarboxylic acids, illustrated by vinyl acetate. Other comonomers which may be used to form copolymers with the vinyl halide are vinylidene chloride, ethyl acrylate, and acrylonitrile. When vinyl copolymers are employed they are preferably composed of at least 50 percent of the vinyl halide. The vinyl polymers or copolymers should be characterized by low molecular weights as evidenced by an inherent viscosity of between about 0.60–0.80, as determined by ASTM D–1243.

Incorporation of the vinyl resin further improves the processability of the chlorosulfonated polyethylene and enables the composition to be more readily worked on mills and calendered into the fabric. The vinyl resin also imparts additional "life" or resiliency to the chlorosulfonated polyethylene and permits embossed patterns to be retained over extended periods rather than diminish with ageing. Further, the presence of the vinyl resin in the base coat enables better adhesion of the second pigment-containing vinyl resin coat described hereinafter. Where a vinyl resin is present in the upper part of the foregoing range, the resulting fabric will generally have greater stiffness as compared to an impregnated fabric wherein a vinyl resin is used in amounts approaching the lower end of the above range.

As indicated in the drawing, FIGURE 1 designates the calendering operation wherein the chlorosulfonated polyethylene, preferably blended with a vinyl resin, is calendered into a fabric to obtain a thorough impregnation of the fabric. In general, approximately sixteen to twenty ounces per square yard are applied for most applications, using calendering rolls at temperatures of between about 260°–300° F.

After the initial calendering operation, the impregnated base fabric is then coated with a layer of a similar vinyl resin, generally containing a pigment, as indicated in FIGURE 2. The presently preferred vinyl resin layer consists of a polyvinyl chloride or a copolymer of vinyl chloride and vinyl acetate dissolved in a soluble solvent such as methyl ethyl ketone, dimethyl formamide, methyl isobutyl ketone and mixtures thereof. Any desired pigment may be used which may be incorporated into the vinyl resin solution and does not materially affect the ultimate properties. For certain aesethetic appearances, wherein a metallic effect is desired, the pigment may be flake bronze, aluminum or mica. Depending upon the ultimate use of the end product, several applications of vinyl resin may be deposited. Usually, the vinyl resin coat is added to a thickness of between about .0015 to .0030 inch.

After the vinyl resin coat has been applied, it is normally dried, for example, with heat lamps. Frequently, a grain-like appearance is desired and to achieve such an effect the composite fabric containing the dried vinyl resin coating is embossed with an appropriate pattern as indicated in FIGURE 3. Embossing may be accomplished in any one of several ways such as by passing the coated fabric through a Rotocure machine against an embossing paper or by subjecting the coated fabric to the action of engraving rolls. Any similar method may be employed which will result in impressing a desired pattern into the vinyl resin coat.

Figure 4:
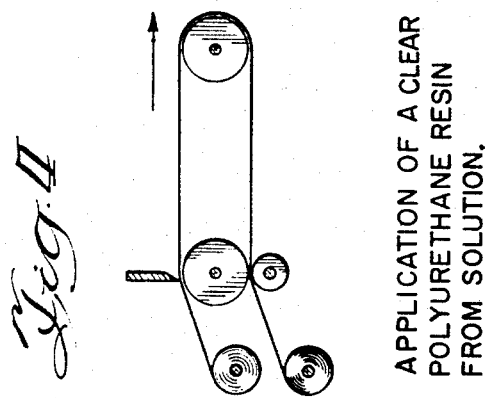

A final layer of clear polyurethane resin is then preferably applied to the vinyl resin as a clear protective and finish coat, as indicated by FIGURE 4. This layer may be deposited from a suitable solvent solution using solvents such as methyl ethyl ketone, dimethyl formamide or toluene and mixtures thereof. The specific solvent will depend upon viscosity of the resin, speed of application, solvent volatility required for a particular process and similar factors associated with a commercial process.

This final polyurethane resin coat should normally have a thickness of between about .002 to .004 inch.

In general, a flexible, partially-crosslinked type of polyurethane resin should be employed as the final coat rather than a rigid type of composition. The polyurethanes contemplated are derived from the reaction of polyisocyanates and polyhydroxy compounds, preferably of the hydroxyl-containing polyester variety. Alternately, polyethers such as polyethylene glycols, derived from polymerizing ethylene oxide, may be used to provide the hydroxyl reaction group. A typical polyurethane is one made from the reaction of tolylene diisocyanate and diethylene glycol-adipic acid polyester having a molecular weight of the order of 3000. Additional disclosure as to polyurethane resin systems and coatings may be found in the Reinhold publication "Polyurethanes," copyright 1957, and the patent to Rinke et al. 2,511,544. To improve the characteristics of the top polyurethane coating up to about one percent of a silicone oil may be added such as a methyl or ethyl derivative silicone. This addition tends to assist in eliminating surface marring of the top coat.

Where a final, very high polish surface is desired, the composite fabric may be passed through a finishing operation, such as through a Rotocure machine against a smooth polyester film as indicated by FIGURE 5.

The resultant "fabric" is tough, flexible and crack resistant and readily susceptible to fabrication including cutting, sewing and assembly by means of an adhesive. In broadly analogous fabrics wherein vinyl resins have been employed as the surface coat, such resins require the use of a plasticizer to obtain the desired characteristics. Where shoes are made from such fabrics by use of an adhesive to hold uppers and soles together, for example, the plasticizers will frequently leach into the adhesive and loosen the assembly. To overcome this tendency, the vinyl coat of these fabrics are usually buffed off. This is not necessary with the present fabrics which may be used directly with most adhesive systems.

In a typical example of the preparation of the material contemplated herein, a four ounce per square yard woven cotton fabric is initially coated with a blend of 35 parts of polyvinyl chloride, inherent viscosity 0.70, and 65 parts of a chlorosulfonated polyethylene resin containing about 25 percent chlorine and approximately one percent sulfur. This base coat is applied to the fabric and calendered to a thickness of approximately .015 inch. A .002 inch polyvinyl chloride resin coat containing a metallic bronze pigment is then applied to the base from a methyl ethyl ketone solvent solution and dried. A final layer of a polyester tolylene diisocyanate polyurethane coat of about .003 inch is then deposited and, after drying, the composite fabric is passed against a highly polished polyester film in a Rotocure. The final product had a high gloss, could be readily cut by the usual cutting machines employed in the shoe industry and revealed no cracking or crazing after repeated flexing.

I claim:

1. A composite fabric comprising a base fabric impregnated with a chlorosulfonated polyethylene, a second coating of a vinyl resin selected from the group consisting of polyvinyl halide and a copolymer of vinyl halide containing above 50 weight percent of the halide and a final coating of a transparent polyurethane resin.

2. A composite fabric comprising a base fabric impregnated with a blend of chlorosulfonated polyethylene and from thirty to seventy percent by weight of a vinyl resin, a second coating of a vinyl resin and a final coating of a transparent polyurethane resin, said vinyl resin of the second coating and the blend is selected from the group consisting of polyvinyl halide and a copolymer of vinyl halide containing above 50 weight percent of the halide.

3. A composite fabric as described in claim 2 wherein the vinyl resin of the blend and the second coating is polyvinyl chloride.

4. A composite fabric as described in claim 2 wherein said second coating contains a pigment.

5. A composite fabric as described in claim 4 wherein said pigment is a metal flake.

6. A composite fabric as described in claim 2 wherein said second coating has been embossed.

7. A composite fabric as described in claim 2 wherein the vinyl resin of the second coating and of the blend is selected from the group consisting of polyvinyl chloride and a copolymer of vinyl chloride and vinyl acetate.

8. A method of making a composite fabric which comprises calendering a base fabric with a chlorosulfonated polyethylene at a temperature of from about 260° F. to 300° F. to impregnate such fabric with the polyethylene, contacting the blend-impregnated base fabric with a solvent solution of a vinyl resin selected from the group consisting of polyvinyl halide and a copolymer of vinyl halide containing above 50 weight percent of the halide and drying to remove the solvent to form a coating of the vinyl resin and, thereafter, contacting the dried, coated, impregnated fabric with a solvent solution of a transparent polyurethane resin and drying to remove the solvent to form a final coating of the polyurethane resin.

9. The method of claim 8 wherein the base fabric is impregnated with a blend of chlorosulfonated polyethylene and from about 30 to 70 percent by weight of a vinyl resin selected from the group consisting of polyvinyl halide and a copolymer of vinyl halide containing above 50 percent by weight of the vinyl halide.

References Cited

UNITED STATES PATENTS

| 2,511,544 | 6/1950 | Rinke et al. | 260—77.5 |
| 2,519,068 | 8/1950 | Richardson | 117—76 |
| 2,586,363 | 2/1952 | McAlevy | 260—79.3 |
| 2,901,467 | 8/1959 | Croco | 117—161 X |

WILLIAM D. MARTIN, *Primary Examiner.*

R. HUSACK, *Assistant Examiner.*

U.S. Cl. X.R.

117—64, 71, 76